INVENTORS
DAVID N. GROVER
ROBERT B. CRANE
BY
ATTORNEYS

United States Patent Office

3,378,847
Patented Apr. 16, 1968

3,378,847
COMBINATION SKY WAVE AND DIRECT
WAVE COMMUNICATIONS
David N. Grover, Grand Rapids, and Robert B. Crane,
Ann Arbor, Mich., assignors to Lear Siegler, Inc.
Filed June 13, 1966, Ser. No. 556,955
11 Claims. (Cl. 343—103)

ABSTRACT OF THE DISCLOSURE

This invention relates to circuit means for detecting and measuring signals which are corrupted or distorted by multipath reflection such as result when high frequency signals travel more than one route between a transmitter and a receiver. In this arrangement, an incoming signal is convolved, multiplied, delayed, and algebraically added in such a manner that all the received signal energy is utilized to measure the desired parameter.

---

This invention relates to pulse transmission systems and, more particularly, to a method and apparatus for detecting and measuring various parameters of signals corrupted or distorted by multipath reflections.

It is well known in the art that high frequency signals transmitted from one location to a suitable receiver at another location often travel more than one route between the transmitter and the receiver. The pulse which travels the most direct route between the transmitter and the receiver is commonly referred to as the direct wave or the ground wave, while the pulse or pulses which reach the receiver after being reflected by the ionosphere are commonly referred to as sky waves or reflected waves. Obviously, where the transmitted wave follows two or more paths to the receiver and where these paths differ in length such as is the case with sky waves and ground waves, corresponding intelligence indicia will arrive at the receiver at different times depending upon the particular path followed. The delayed arrival of the sky wave often causes the transmitted signal parameters to be corrupted and distorted to the point that they cannot be utilized as an accurate source of information.

Consider, for example, the LORAN navigational system wherein aircraft position is determined by the relative times of arrival of pulses at a receiver positioned in the aircraft which have been transmitted from a master station and one or more slave stations. More specifically, pulses transmitted synchronously from the master station and the slave stations will arrive at the receiver separated in time by an amount dependent upon the position of the receiver. These time differences are utilized to uniquely determine the receiver position by means of the intersection of two hyperbolic curves resulting from the locus of points which describe the particular time differences. It will be readily apparent that signals which have been corrupted or distorted by multipath reflections are not satisfactory for utilization in sophisticated systems of this type.

The solution to this problem which has been employed generally is to use only that part of the signal which has not been corrupted by multipath distortion. More particularly, sampling techniques are utilized whereby only the first few microseconds of the received signal are utilized to determine its time of arrival. The sampling is conducted during the time period which elapses between the arrival of the ground wave and the first possible arrival of a reflected wave. The balance of the signal energy is discarded as unusable.

The drawbacks of the sampling system are apparent. The amplitude of the direct or ground wave is often nearly negligible when compared to the amplitude of the reflected wave. This requires that the receiving system, in order to be accurate, be extremely sophisticated in the sense that it will not tend to detect the arrival of ground waves which, in reality, have not been transmitted. Even if accurate samplings are realized, the relatively small amount of signal energy available requires repeated and time consuming integrations before the receiver position can be calculated. As regards this latter sampling technique aspect, it will be apparent that the speed with which the position can be calculated is of extreme importance insofar as high-speed aircraft are concerned. If the time to compute a position is long enough for the aircraft to travel a relatively long distance, the accuracy of the system will be markedly degraded. Present receivers, for example, require up to 16 minutes to integrate sufficient signal energy to measure time differences.

Time of arrival is not the only signal parameter which is subject to distortion or corruption by multipath reflections, nor is it the only parameter which has been derived heretofore through the utilization of "sampling point" receivers. As an aid to the understanding of this invention, its description will be couched generally in terms of the time of arrival parameter. It will be apparent, however, to those skilled in the art that the teachings set forth herein will find usage in the measurement of other types of signal parameters and it is not intended to limit the scope of this invention to detection of the time of arrival parameter.

It is an object of this invention to provide a pulse transmission system particularly adaptable for utilization in measuring and detecting the various parameters of signals corrupted or distorted by multipath reflections.

More particularly, it is an object of this invention to provide a pulse transmission system of the type described which is capable of utilizing all of the received signal energy despite the fact that it is corrupted by multipath reflections.

It is an object of this invention to provide a transmission system wherein detection and parameter measurement is both faster and more accurate than that previously achieved.

It is an object of this invention to provide a pulse transmission system which is subject to flexible construction techniques whereby it may be implemented so as to operate harmoniously with either analogue or digital subordinate equipment.

It is yet another object of this invention to provide a pulse receiving system particularly adapted to detect the time of arrival of a received pulse which has been contaminated by multipath reflections.

It is an object of this invention to provide a system for measuring the time of arrival of pulses which, when incorporated into the LORAN system, is capable of quickly and accurately determining aircraft location.

These and other objects of this invention will be readily understood by reference to the following specification and accompanying drawings in which.

Briefly, this invention comprises a pulse receiving system wherein the incoming signal is convolved, multiplied, delayed and algebraically added in such a manner that all of the received signal energy is utilized to detect and/or measure the desired parameter. The convolution operation is performed by means of a matched filter network wherein the incoming wave form is stacked so as to improve the signal to noise ratio thereof. The convolved signal is stored and repeatedly subjected to varying delays and varying amplifications, the products of which are algebraically summed and normalized. Various amplification and delay factors are successively chosen until such time as a maximum output signal is established.

In its more limited aspects, this invention comprises an apparatus and/or method for detecting the time of arrival of a direct wave corrupted by one or more sky waves wherein the time of arrival of the sky wave is intially established. Means are provided for measuring the delay of the sky wave with respect to the direct wave from which the estimated time of arrival of the direct wave may be easily established by subtracting the delay period from the time of arrival of the reflected wave.

Figure 1:
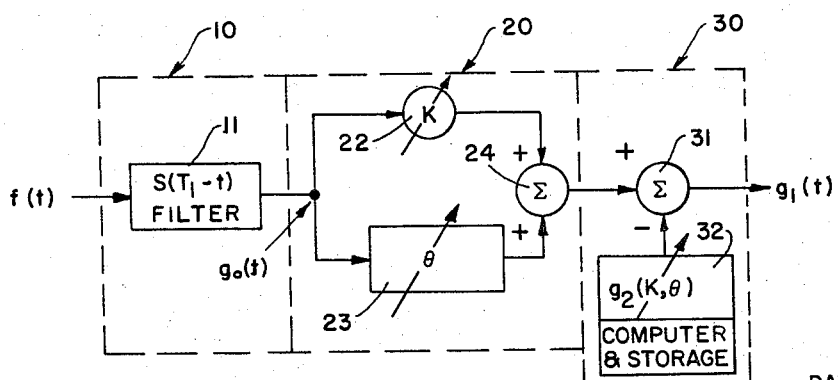
FIG. 1 is a schematic, block diagram illustrating the functional inter-relationship of the components which form the receiver system which is the subject of this invention.

Referring now to the figures, a preferred embodiment of this invention will be described in detail. Referring initially to FIG. 1, assume a received signal $f(t)$ which may be a direct wave contaminated by one or more sky waves and noise signals. Assume further that, as in the case in the LORAN navigation system, the particular wave parameter desired is the time of arrival of the direct wave. The sky wave has an unknown relative amplitude K and an unknown relative delay $\theta$ with respect to the ground wave.

The input signal $f(t)$ is routed initially into the convolution section 10 of the receiver where it is convolved with $S(T_1-t)$ to obtain $g_0(t)$. Expressed in mathematical terms, $$g_0(t) = \int_{t-T}^{t} f(y) S(T_1-t+y) dy$$

Figure 2:
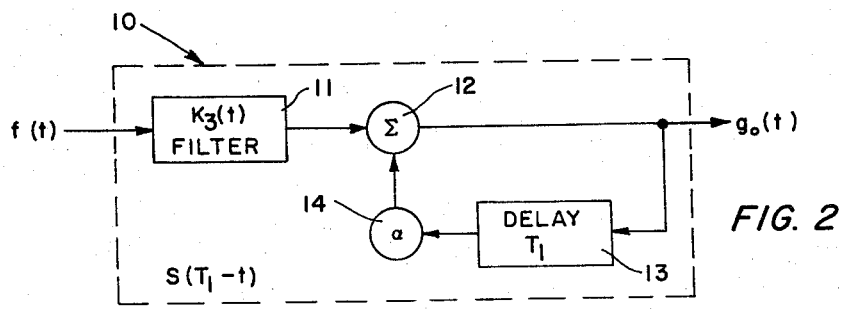
FIG. 2 is a schematic, block diagram illustrating the details of the filter section of the device.

As indicated in detail in FIG. 2, convolution section 10 includes an R.F., R-L-C or I.F. filter 11 denoted by the function $K_3(t)$ which is matched to the transmitted signal, a delay element 13 ($T_1$) which functions to add successive pulses to the accumulating total as a means of improving the signal-to-noise ratio, an amplifier 14 having a gain constant adjusted such as to retain the delay line in stable condition and a conventional summing amplifier 12. The convolution between the received signal $f(t)$ and the filter $K_3(t)$ actually occurs such that the output of filter 11 can be expressed as:

$$\int_{t-T}^{t} f(y) K_3(t-y) dy$$

Subsequent to the convolution of $f(t)$, the resultant signal $g_0(t)$ is multiplied by K and summed with $g_0(t)$ delayed by $\theta$. The resulting sum is diminished or normalized by $g_2(K g \theta)$ to obtain $g_1(t)$ and this value is stored. Several different values of $g_1(t)$ are obtained by varying the values of K and $\theta$. For instance, one value of K can be set and $\theta$ varied until such time as a peak value is obtained. Then K can be changed and the process repeated until such time as another peak value is obtained. The new peak value is compared to the old peak value and the largest of the two retained. These operations are repeated until all values of K and $\theta$ have been utilized. Once this process is completed, the time at which $g_1(t)$ is a maximum is established. This value occurs when the amplification factor K of amplifier 22 equals the actual K of the sky wave and when the delay factor $\theta$ of delay element 23 equals the actual delay of the sky wave with respect to the direct wave. By subtracting $\theta+T_1$ from this maximum value the time of arrival of the direct wave can be estimated with extreme accuracy.

Figure 3:
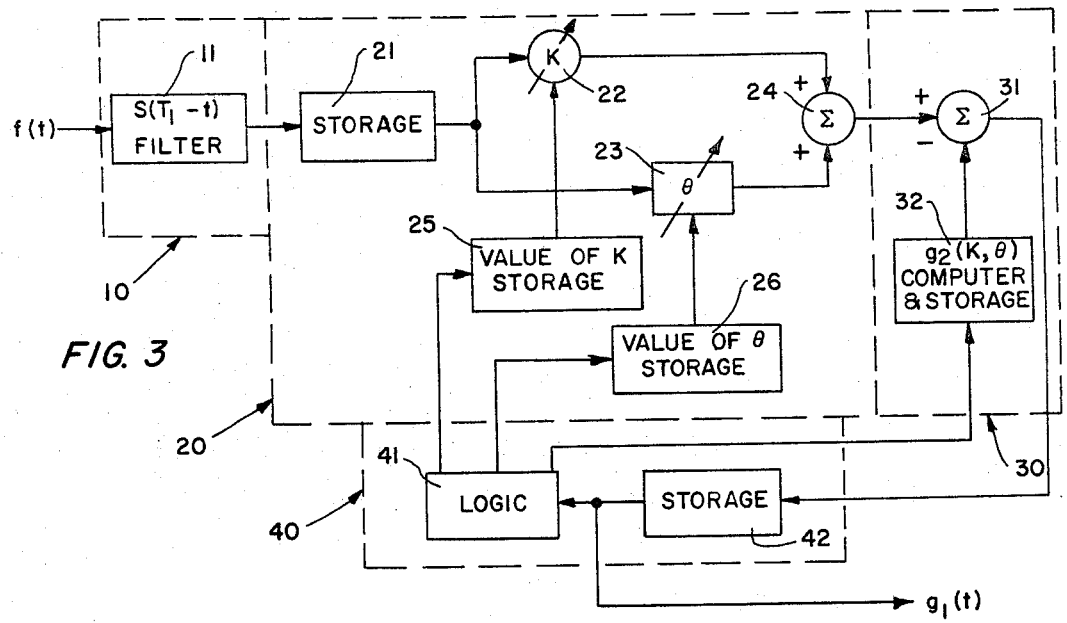
FIG. 3 is a schematic, block diagram illustrating the manner in which various signals are derived and transmitted to the elements shown in FIG. 1 so as to obtain the desired information.

As shown more specifically in FIG. 3, the output of matched filter 11 is stored in storage device 21 so that the signal will be available constantly for further and repetitious operations. The amplification factor K of amplifier 22 and the delay $\theta$ of delay element 23 are then set at some predetermined initial values and the resultant signal $g_1(t)$ stored in storage register 42. Further programmed values of K and $\theta$ are then introduced into amplifier 22 and delay element 23 via their respective storage devices 25 and 26. The resultant output $g_1(t)$ is also fed to storage register 42 where it is compared by logic section 41 with the prior value of $g_1(t)$. The maximum value is retained and, from the discrepancy, logic section 41 determines in what manner the values of K and $\theta$ should be further adjusted to obtain the over-all maximum $g_1(t)$. Once these decisions have been made, the values of K register 25 and $\theta$ register 26 are readjusted by logic section 41 and the comparison and readjustment process repeated until such time as the maximum value of $g_1(t)$ is determined.

During the sequential comparison operations outlined above, logic section 41 performs a number of distinct functions. First, it acts as a comparator to determine which value of $g_1(t)$—i.e. the most recent or that previously stored—is of greater magnitude. Second, through some predetermined program, it determines in what manner the values of K and $\theta$ should be readjusted to reach the maximum $g_1(t)$ most quickly and adjusts storage devices 25 and 26 accordingly. Finally, logic section 41 routes the stored values of K and $\theta$ to the $g_2(K,\theta)$ normalizing section 30 such that a proper normalizing function will always be available at the negative input to summing amplifier 31.

The functions of sections 20 and 30 of the system may be expressed mathematically as follows:

$$g_1(t) = K \int_{t-T}^{t} f(y) S(T_1-t+y) dy + \int_{t-T}^{t} f(y) S(T_1-t+y+\theta) dy - g_2(K,\theta)$$

where $$g_2(K,\theta) = \tfrac{1}{2}(1+K^2) \int_0^T [S(t)]^2 dt + K \int_0^T S(t) S(t-\theta) dt$$

Normalizing section 32 calculates and stores the value of $g_2(K,\theta)$ in accordance with the above equation in response to each set of values of K and $\theta$ which are routed to it by logic section 41. During any particular operational step, of course, the values of K and $\theta$ utilized to calculate $g_2(K,\theta)$ will be identical to those values currently stored in amplifier register 25 and delay register 26. The resultant calculated signal is stored in section 32 in such a manner that it is constantly subtracted from the output of summing amplifier 24 at summing amplifier 31 to obtain $g_1(t)$. Each time the values of K and $\theta$ in registers 25 and 26 are readjusted, corresponding readjustment is made of the normalizing function $g_2(K,\theta)$.

The output at some time $T_1$ after the delay $\theta$ is expressed mathematically as follows:

$$g_1(t+T_1+\theta) = \int_{t+T_1+\theta-T}^{t+T_1+\theta} f(y) S(y-t-\theta) dy + \int_{t+T_1+\theta-T}^{t+T_1+\theta} f(y) S(y-t) dy - g_2(K,\theta)$$

Once the time of occurrence of the maximum value of $g_1(t)$ has been determined, it is necessary only to subtract $\theta + T_1$ to ascertain the time of arrival of the direct or ground wave.

Thus, it will be seen that the signal receiver system which is the subject of this invention establishes the desired parameter of the incoming signal by utilizing the total amount of signal energy present in the incoming wave form. This is accomplished by varying the values of K and $\theta$ to adapt the receiver to optimumly detect and measure the particular received signal. Particular values of K and $\theta$ differ for the optimal processing of differing signals. Once the particular values of K and $\theta$ for optimal processing of a particular signal are established, the desired information can be derived mathematically.

The apparatus as disclosed is provided with a logic section for varying the values of K and $\theta$ according to a predetermined program which utilizes previous discrepancies in output signals to determine the manner in which K and $\theta$ should be varied to adjust the receiver for optimum reception of a particular signal. It will be appreciated by those skilled in the art, however, that the values K and $\theta$ could be manually varied by any suitable means through a series of "guessed" values and the same result would be obtained. That is to say, that the output will be a maximum only when the "guessed" K is identical to the actual relative amplitude of the sky wave with respect to the ground wave and the "guessed" $\theta$ is identical to the actual delay of the sky wave with respect to the ground wave. These values may then be utilized as indicated above to establish the desired parameter of the incoming signal.

It will be readily appreciated by those skilled in the art that the hardware implementation of the concepts disclosed herein is extremely flexible in that a myriad of different types of components may be utilized. The system may be designed so as to operate harmoniously with digital or analogue accessory equipment which perform the necessary mathematical operations discussed herein. It is estimated that the utilization of the receiver network as disclosed will allow a decrease of integrating time to approximately ¼ of the time existing receivers require. This important decrease is a product of the present system's ability to utilize the entire portion of the received signal rather than having to depend upon sample input signals. The accuracy of the present system is certainly as good as existing receivers and much better in the sense that the possibility of receiving or detecting an undesirable signal is virtually eliminated.

By utilization of the present system, positional calculations for an aircraft traveling at a rate of approximately 16 miles a minute may easily be made in less than four minutes. Prior art position locating receivers utilizing the sampling techniques discussed previously would require up to 16 minutes to integrate a sufficient amount of signal energy to measure the required time differences. Thus, it will be apparent that the ability of this system to utilize the entire incoming system substantially increases the rapidity with which the desired information may be calculated.

While a preferred embodiment of this invention has been described in detail, it will be readily apparent to those skilled in the art that many modifications may be made without departing from the spirit and scope of the disclosure. Such modifications are to be deemed as included by the following claims unless these claims, by their language, expressly state otherwise.

We claim:
1. An apparatus for detecting a desired parameter of signals corrupted by multipath reflections comprising:
   variable delay means and variable gain means connected in parallel and adapted to receive said signals;
   summing means for summing the outputs of said variable delay means and said variable gain means; and
   means for selectively varying the amplification factor and the delay factor of said variable gain means and said variable delay means respectively.

2. The apparatus as set forth in claim 1 which further comprises:
   normalizing means for normalizing said signals after summing by said summing means, said normalizing means being responsive to contemporary values of said amplification factor and said delay factor whereby the correct normalizing signal may be calculated; and
   means for monitoring the values of said normalized signal.

3. The combination as set forth in claim 2 which further comprises means for convolving said signal prior to the time that it is routed in parallel to said variable delay means and said variable gain means.

4. The apparatus as set forth in claim 3 which further comprises first storage means for retaining said signal subsequent to the convolution thereof and for making it constantly available to said variable delay means and said variable gain means.

5. The combination as set forth in claim 4 which further comprises:
   second storage means for storing at least two different sequential output values of said monitoring means;
   comparator means for determining which of said two values possesses the desired relative magnitude and for retaining the value of greater relative magnitude.

6. The combination as set forth in claim 5 wherein said varying means comprises logic means operable according to a predetermined program for varying values of said amplification factor and said delay factor in response to the output of said comparator means.

7. Apparatus for determining the time of arrival of a signal corrupted by multipath reflections comprising:
   means for convolving said signal;
   variable delay means and variable gain means each adapted to receive said signal after convolution thereof;
   means for summing the outputs of said variable delay means and said variable gain means;
   means for varying the amplification factor and the delay factor of said gain means and said delay means respectively;
   means for normalizing the output of said summing means in response to the contemporary settings of said variable gain means and said variable delay means; and
   means for monitoring the normalized output to ascertain the particular amplification and delay factors which cause it to be of peak magnitude whereby the delay of the reflected wave with respect to the direct wave may be ascertained.

8. The combination as set forth in claim 7 which further comprises:
   storage means for storing at least two different sequential output values of said monitoring means;
   comparator means for determining which of said two values possesses the desired relative magnitude and for retaining the value of greater relative magnitude.

9. The apparatus as set forth in claim 8 wherein said monitoring means includes comparator means for comparing the normalized outputs resulting from differing settings of said varying means and wherein said varying means comprises logic means operable according to a predetermined program for varying said amplification factor and said delay factor in response to the output of said comparator means.

10. A method of detecting and measuring a desired parameter of signals corrupted or distorted by multipath reflections wherein the total received signal energy is utilized comprising the steps of:
   measuring said desired parameter of the reflected wave;
   measuring the relationship of said reflected wave parameter with respect to the desired direct wave parameter; and
   calculating said desired direct wave parameter from said desired parameter of the reflected wave and said relationship.

11. The method as set forth in claim 10 wherein the parameter desired to be measured is the time of arrival of said direct wave; wherein the time of arrival of the reflected wave is measured; wherein the delay of said reflected wave with respect to said direct wave is measured; and, wherein the time of arrival of said direct wave is calculated by subtracting said delay from said time of arrival of the reflected wave.

References Cited

UNITED STATES PATENTS

| | | | |
|---|---|---|---|
| 2,350,702 | 6/1944 | Ullrich | 325—476 |
| 3,174,151 | 3/1965 | Abourezk | 343—103 |
| 3,177,489 | 4/1965 | Saltzberg | 325—476 X |
| 3,213,450 | 10/1965 | Goor | 325—476 X |

RODNEY D. BENNETT, *Primary Examiner.*

H. C. WAMSLEY, *Assistant Examiner.*